Figure 1:
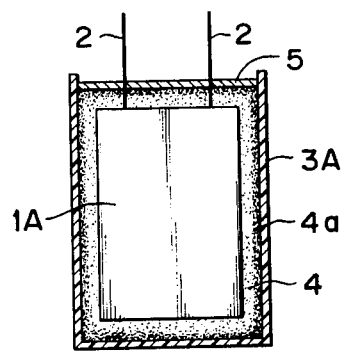

United States Patent

Otsuki et al.

[11] 4,073,835
[45] Feb. 14, 1978

[54] METHOD OF RESIN ENCAPSULATING ELECTRICAL PARTS WITH UV CURING OF FIRE RETARDANT RESIN

[75] Inventors: Akira Otsuki; Makoto Nishino, both of Tokyo, Japan

[73] Assignee: Toyo Ink Manufacturing Co., Ltd., Tokyo, Japan

[21] Appl. No.: 653,878

[22] Filed: Jan. 30, 1976

[51] Int. Cl.[2] .................. B29C 5/00; B29D 3/00; B29G 3/00
[52] U.S. Cl. .................. 264/22; 106/15 FP; 264/236; 264/272
[58] Field of Search .......... 106/15 FP; 260/DIG. 24; 264/22, 85, 236, 272, 336, 337

[56] References Cited

U.S. PATENT DOCUMENTS

| | | | |
|---|---|---|---|
| 2,525,664 | 10/1950 | Gadsby et al. | 264/22 |
| 2,893,061 | 7/1959 | Terry | 264/85 |
| 2,899,402 | 8/1959 | Squire | 264/347 |
| 2,963,747 | 12/1960 | Brown | 264/272 |
| 3,023,122 | 2/1962 | DePataky | 264/236 |
| 3,560,253 | 2/1971 | Ashton | 106/15 FP |
| 3,583,962 | 6/1971 | Magay | 106/15 FP |
| 3,653,959 | 4/1972 | Kehr et al. | 264/272 |

*Primary Examiner*—Willard E. Hoag
*Attorney, Agent, or Firm*—Frank J. Jordan

[57] ABSTRACT

A process for the formation of a protective coating on an electrical element which comprises housing an electrical element such as a capacitor in a mold made of a ultraviolet rays transmissible material, introducing a fire retardant liquid resin composition into the space between the mold and the electrical element to enclose the element with the composition and then perfectly curing the liquid resin composition by firstly irradiating ultraviolet rays on the composition for partial cure thereof and secondly heating the partially cured composition for complete cure thereof thus forming a protective coating on the electrical element.

8 Claims, 2 Drawing Figures

METHOD OF RESIN ENCAPSULATING ELECTRICAL PARTS WITH UV CURING OF FIRE RETARDANT RESIN

This invention relates to a process for forming a protective coating on an electrical element from a curable resin.

It has heretofore been customary to form a protective coating on electrical elements such as condensers or capacitors and resistors, from curable resins such as unsaturated polyesters and epoxy resins, in order to prevent the electrical elements from being injured and dewed and absorbing moisture as well as from being corroded thereby improving them in physical and chemical endurances.

Processes which have been known as those for the formation of such protective coatings include potting, encapsulating, sealing and immersing. When the immersing method is used, it will be difficult to form coatings in uniform thickness and shape. In the practice of the present invention, therefore, the potting, encapsulating or sealing process using molds may be employed.

The conventional processes using a thermosetting resin have the following disadvantages.

(1) It usually takes as many as 2 – 10 hours to heat cure the thermosetting resin thereby lowering the efficiency of molding operation and decreasing the repetition of use of the molds.

(2) Expensive molds are necessary to use.

(3) Difficulties are very often caused when the molding is released from the mold.

(4) Protective resin coatings formed have unsatisfactory gloss on the surface thereby to render them of low commercial value.

(5) Protective resin coatings formed have unsatisfactory properties. For example, they will be cracked when they are immersed in warm water for a while.

The primary object of this invention is to provide a process for forming on electrical elements a protective resin coating which eliminates the above drawbacks attending the conventional similar processes.

This object is achieved by housing an electrical element in a mold made of an ultraviolet rays-transmissible material, introducing to the space between the electrical element and the mold a liquid resin composition which is crosslinkable or curable under the action of ultraviolet rays and heat, thereby forming a layer or the resin composition enclosing the element, irradiating ultraviolet rays on the electrical element to partially cure the element thereby curing at least the outer side of the resin composition layer and then heating the partially cured element to complete the cure thereof.

Figure 2:
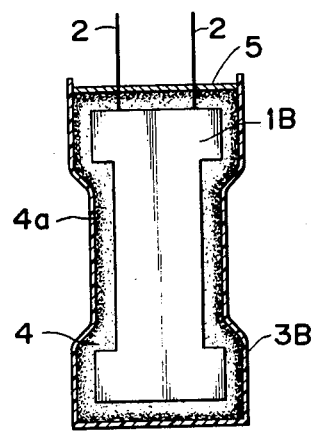

This and other objects will be apparent from the following description and the accompanying drawing in which:

FIG. 1 is a longitudinally sectional view showing an embodiment of this invention in which ultraviolet rays have been irradiated to cure the outer side of a liquid resin composition in a mold; and FIG. 2 is a longitudinally sectional view showing a similar embodiment of this invention.

Referring now to FIG. 1, an electrical element 1A with lead wires or terminals 2 such as an electrical resistor or capacitor, is housed in a cup-like mold 3A coaxially therewith with aid of supports 2 for the electrical element 1, the mold being made of an ultraviolet rays transmissible material. A liquid resin composition 4 is introduced into the space between the element 1 and the mold, an air preventing layer 5 is formed on the portion of the resin composition 4 at the open top of the mold 3, ultraviolet rays are irradiated on around the mold for suitable times to cure the outer side 4a of the liquid resin composition 4 and then the resin composition 4 so partially cured is heated to complete the cure thereof thus obtaining a protective coating for the element 1. The degree of cure of the liquid resin composition layer at 4a effected only by the irradiation of ultraviolet rays varies decreasingly from the outside to the inside of the resin composition layer.

Referring then to FIG. 2, an electrical element 1B with lead wires or terminals 2 is housed in a mold 3B having an open top and consisting of two separable parts, followed by taking the same procedure as previously mentioned with reference to FIG. 1 to perfectly cure the liquid resin composition whereby a protective coating for the element 1B is obtained.

It should be noted that the reason for the use of both ultraviolet rays irradiation and heat as the energy sources for the cure of the liquid resin composition in the practice of this invention is as follows.

The single use of heat as the energy source will incur such disadvantages as mentioned before.

On the other hand, the single use of ultraviolet rays irradiation will not be expected to complete the cure of the liquid resin composition since the protective resin coatings contemplated by this invention are approximately 0.3 – 5.0mm in thickness whereas if a resin layer is irradiated by ultraviolet rays then it will usually be crosslinked or cured to the depth of only 1 – 2mm. In this case, if an electrical element to be covered with a protective resin coating is complicated in shape then the protective coating formed only under the action of ultraviolet rays will contain more portions thereof left uncured. As is seen from the above, the use of ultraviolet rays irradiation and subsequent heating will permit an efficient performance of the operation and the formation of commercially valuable protective resin coatings in which an electrical element is enclosed.

In the practice of this invention the irradiation of ultraviolet rays is effected to the extent that the liquid resin composition in the mold is crosslinked and cured on at least its outer side. Since the curing effect of ultroviolet rays irradiation extends to the portion of the liquid resin composition approximately 1 – 2 mm below the outer surface thereof as previously stated, the irradiation of ultraviolet rays should be effected for usually not more than 5 minutes, preferably about 5 – 30 seconds. Ultraviolet rays may be irradiated on the top, bottom and wall of the liquid resin composition conforming to the shape of the space between the mold and the electrical element surrounded with the resin composition.

In this invention, if an electrical element to be surrounded with the liquid resin composition in the mold is simple in shape and the resin composition surrounding the electrical element in the mold is relatively small (about 2 mm or less) in thickness and subjected to ultraviolet rays irradiation, then the element and the partially cured resin composition enclosing said element will be released as a whole from the mold, followed by being heated thereby to complete the cure of the partially cured resin composition; to the contrary, if the electrical element is complicated in shape and the liquid resin composition surrounding or enclosing the electrical element in the mold is relatively large (larger than about 2 mm for example) in thickness, then the liquid resin composition when irradiated will be cured at the outer side while it will remain liquid and uncured. In this case the irradiated resin composition is allowed to still remain in the mold for being heated by infra-red rays irradiation or in an oven for completing the cure of the irradiated resin composition. In this heating step, the electrical element with the incompletely cured resin composition enclosing the element may be withdrawn from the mold for being further heated outside thereof for completing the cure of the resin composition.

The liquid resin compositions which may be crosslinked or cured under the action of firstly ultraviolet rays and secondly heat according to this invention, include as the essential components at least one known ethylenically unsaturated monomer and/or prepolymer, a photopolymerization initiator and thermopolymerization initiator and may further include various additives such as fire retardant, filler and pigment.

The monomers having a double bond, that is ethylenically unsaturated monomers, used herein include styrene and its derivatives; acrylic esters such as methyl acrylate, ethyl acrylate, butyl acrylate, 2-ethylhexyl acrylate and 2-hydroxyethyl acrylate; methacrylic esters such as methyl methacrylate, ethyl methacrylate, butyl methacrylate and 2-ethylhexyl methacrylate; and higher acrylates or methacrylates such as ethylene glycol di(meth)acrylate, diethylene glycol di(meth)acrylate, 1,6-hexane di(meth)acrylate, 1,3-butanediol di(meth)acrylate, trimethylolpropane triacrylate, pentaerithritol di(meth)acrylate and pentaerithritol tri(meth)acrylate. The polyol poly(meth)acrylates are particularly preferred because of their non-volatility. The term "(meth)acrylate" used herein is intended to mean an acrylate and a methacrylate.

The prepolymers having double bonds, that is the ethylenically unsaturated prepolymers, used herein include adducts of epoxy resins with acrylic acid or methacrylic acid, compounds having at least one double bond introduced therein by the reaction of an urethane prepolymer and hydroxyethyl (meth)acrylate, compounds prepared by introducing glycidyl (meth)acrylate into a carboxyl group-containing polymer, and various unsaturated polyesters.

The photopolymerization initiators which may be used in this invention include benzoin type compounds such as benzoin methyl ether, benzoin ethyl ether, benzoin isobutyl ether, α-methylbenzoin, α-arylbenzoin and α-chlorodesoxybenzoin; ketone type compounds such as benzophenone, acetophenone and bisdialkylaminobenzophenone; azo type compounds such as azobisisobutyronitrile; quinone type compounds such as anthraquinone and phenanthraquinone; and sulfides such as benzyl disulfide and tetramethylthiuram monosulfide.

The thermopolyerization initiators used herein include benzoyl peroxide, t.-butyl perbenzoate, methyl ethyl ketone peroxide and azobisisobutyronitrile. Azobisisobutyronitrile will act as a photopolymerization initiator and as a thermopolymerization initiator.

The photopolymerization initiator and the thermopolymerization initiator may be contained in amounts of about 0.01 – 10% and about 0.001 – 5% in the liquid resin composition, respectively based on the weight thereof.

The protective coatings enclosing, or forming on, electrical elements according to this invention are required to be, per se, fire retardant; to this end, it is preferable to contain in the liquid resin composition 10 – 70% by weight of aluminum hydroxide (such as supplied under the trademark "Hydilite H32" by Showa Denko Co., Ltd.), a combination of a halide and antimony oxide, or each of phosphoric acid esters such as cresyldiphenyl phosphate and triaryl phosphate. Among those, aluminum hydroxide is the most preferable since it is excellent in ultraviolet rays transmissibility thereby not hindering the liquid resin composition from being cured and is also desirable from the viewpoint of the properties required in the protective resin coatings according to this invention.

In one desirable embodiment of this invention, the irradiation of ultraviolet rays on the crosslinkable and curable liquid resin composition in the mold is effected in the atmosphere of an inert gas such an nitrogen, thereby to prevent polymerization inhibition which, as is known, will be caused on the liquid resin composition in the mold due to the contact thereof with the oxygen in air if the mold used is one which is open to the air at the top as shown in FIG. 1.

Such polymerization inhibition due to the contact with oxygen will also be prevented or avoided if ultraviolet rays are irradiated on the liquid resin composition after covering the surface thereof with an inert fluid such as low boiling hydrocarbons.

In the practice of this invention, the mold containing the liquid resin composition and electrical element may further be subjected to degassing as in the case of the formation of a conventional protective coating, before ultraviolet rays are irradiated on the resin composition through the mold.

The ultraviolet rays transmissible materials for the mold used herein include plastics such as polyester, polyethylene, polypropylene, polycarbonate, polytetrafluoroethylene, polymethylmethacrylate, polyacrylonitrile, polyamide, polyvinyl chloride, polyurethane and polystyrene, as well as glass, particularly silica glass.

This invention will be better understood by the following Examples and Comparative examples wherein all parts are by weight unless otherwise specified.

EXAMPLE 1

An electrical resistor (8 mm in diameter and 20 mm in length) was held in a polymethylmethacrylate-made cup-like mold (1 mm in thickness, 12 mm in inner diameter and 24 mm in length) so that it was approximately 2 mm apart from the inner wall of the mold and the inner side of the bottom thereof as shown in FIG. 1, and a liquid resin composition of the following composition was introduced into the mold thereby to cover the resistor with the resin composition. The mold with the resistor and liquid resin composition therein was irradiated uniformly at the wall for 30 seconds, at the top for 5 seconds and at the bottom for 5 seconds in a stream of nitrogen with ultraviolet rays by a 2-Kw high voltage mercury lamp while being kept 10 cm apart from the mold, thereby to incompletely cure the liquid resin composition. The incompletely cured resin composition with the resistor enclosed therein was not deformed even after withdrawn from the mold, and it was then heated at 100° C for two hours in a hot air oven thereby to complete the cure thereof thus forming around the resistor a protective coating which had satisfactory surface gloss and did not crack even when immersed in warmed water.

| Composition of the liquid resin composition | |
|---|---|
| Acrylic-modified expoxy resin [1] | 33 Parts |
| 1,6-hexanediol diacrylate | 20 " |
| Aluminum hydroxide | 30 " |
| Benzoin ethyl ether | 4 " |
| Benzoyl peroxide | 1 " |

[1] The resin was one prepared by addition reacting an epoxy resin (produced under the registered trademark "Epikote 828" by Shell Company) with acrylic acid in the molar ratio of from 1 to 2 by using a conventional method.

The above liquid resin composition was prepared by kneading the ingredients other than the benzoin ethyl ether and benzoyl peroxide on a three-roll mill and then homogeneously mixing the thus-milled ingredients with said non-milled initiators.

EXAMPLE 2

A box-like mold (15mm × 30mm × 40mm) made of a 1mm thick polymethylmethacrylate sheet was allowed to house an electrical condenser or capacitor therein so that the capacitor was held 3mm, on the average, apart from the inner wall and bottom, and a liquid resin composition was poured into the mold to enclose the capacitor therewith. After vacuum degassing the mold and pouring 0.1g of liquid paraffin to form a layer thereof on the portion of the liquid resin composition at the open top of the mold, the mold with the capacitor and liquid resin housed therein was irradiated at the wall, top and bottom respectively for 5 seconds with ultraviolet rays by the use of a 2-Kw high voltage mercury lamp while being kept 10cm apart from the mold, whereby the liquid resin composition in the mold was crosslinked and cured at the surface with the balance remaining uncured. Since the partially cured resin composition enclosing the capacitor therein was thus impossible to release without the deformation thereof from the mold, it was then placed, as it remained in the mold, in an oven and heated therein at 100° C for two hours to complete the cure of the partially cured composition, after which the completely cured resin composition enclosing the capacitor was released from the mold thus obtaining the capacitor enclosed with the completely cured composition which was a protective coating having excellent gloss and other properties.

| Composition of the liquid resin composition | |
|---|---|
| Acrylic acid-modified epoxy resin [2] | 40 Parts |
| Ethylene glycol diacrylate | 13 " |
| Aluminum hydroxide | 40 " |
| Titanium dioxide | 4 " |
| Benzoin ethyl ether | 2 " |
| Benzoyl peroxide | 1 " |

[2] The resin was one prepared by addition reacting an epoxy resin (produced under the trade name "FRRA-4211" by UCC, that is Union Carbide Company) with acrylic acid in the molar ratio of from 1 to 2 by using a conventional method.

The liquid resin composition was prepared from the above ingredients in the same manner as in Example 1.

Comparative Example 1

The procedure of Example 1 was followed except that curing was effected only by the irradiation of ultraviolet rays for the same period of time as Example 1, without subsequent curing effected by heat. The resin composition so cured appeared to have been completely cured; however, it exhibited cracks on the surface in a warm water-resistance test. [*3]

[*3] Warm water-resistance test: A sample is tested for warm water-resistance by immersing the sample in warm at 80° C for 50 hours and thereafter making visual estimation of the state of the sample surface.

The above-mentioned drawback of the partially cured resin composition was not eliminated even after further irradiation of ultraviolet rays thereon for an additional time ten times as long as the initial curing time.

Comparative example 2

The procedure of Example 1 was followed except that curing was effected by heating at 100° for two hours in the oven, without ultraviolet rays irradiation; in this case, the resin composition so heated and the mold were melt bonded to each other thereby rendering it impossible to release from the mold the partially cured resin composition with the capacitor enclosed therein.

Comparative example 3

The procedure of Example 2 was repeated except that curing was effected only by irradiating ultraviolet rays for two minutes, thus obtaining the resin composition partially cured on the outer surface with the inner portion of the resin composition remaining liquid. In addition, the partially resin composition was not further cured even after irradiated by ultraviolet rays for a total of five minutes.

Comparative example 4

If the procedure of Example 2 is followed except that curing is effected only by heating at 100° C for two hours, the resin composition so heated will not be released from the mold since they are melt bonded to each other by the heating as in Comparative example 2; however, when in such case a polyethylene-made mold was used in substitution for the above-mentioned mold, the heated resin composition and the polyethylene-made mold were not melt bonded together while the composition was cracked when subjected to a warm water-resistance test.

EXAMPLE 3

The procedure of Example 1 was followed except that the liquid resin composition was replaced by a new liquid resin composition of the following composition.

| Composition of the new liquid resin composition | |
|---|---|
| Polyester resin (a photopolymerizable polyester resin produced under the trademark "Gohselac" by Nippon Gosei Chemical Company) | 39 Parts |
| Ethylene glycol dimethacrylate | 4 " |
| Talcum powder | 10 " |
| Tris (2,3-dibromopropyl)phosphate | 20 " |
| Azobisisobutyronitrile | 5 " |

The protective coating thus obtained had the same excellent properties as that obtained in Example 1.

EXAMPLE 4

The same procedure as used in Example 1 was followed except that an electrical element was complicated and a mold consisting of two separable parts was used as shown in FIG. 2, thereby to obtain a protective coating having the same properties as that obtained in Example 1.

What is claimed is:

1. A process for encapsulating an electrical element comprising the steps of:
    placing an electrical element in a mold made of an ultraviolet light transmissible material;

introducing a liquid resin composition capable of being cross-linked and cured by the action of ultraviolet light and heat into the space between the mold and the electrical element therein, said composition containing a fire retardant selected from the group consisting of aluminum hydroxide, a combination of a halide and antimony oxide, and phosphoric acid esters and is contained in the liquid resin composition in an amount by weight of 10-70 parts per 100 parts by weight of the resin composition;

irradiating said composition in the mold with ultraviolet light to crosslink and cure at least the outer portion of the liquid resin composition and make the resin removable from the mold without deformation;

removing from the mold the at least partially crosslinked and cured resin composition with the electrical element enclosed therein; and heating said at least partially crosslinked and cured resin composition to complete the cure thereof, thus obtaining an encapsulated electrical element.

2. A process according to claim 1, wherein the irradiation of ultraviolet rays is effected in an inert gas atmosphere.

3. A process according to claim 1, wherein the mold has an open top and the portion of the liquid resin composition at the open top is covered with a low boiling hydrocarbon layer.

4. A process according to claim 1 wherein said heating step is effected prior to said step of removing from the mold the at least partially crosslinked and cured resin composition with the electrical element enclosed therein.

5. A process according to claim 1 wherein said step of removing from the mold the at least partially crosslinked and cured resin composition with the electrical element enclosed therein is effected prior to said heating step.

6. A process according to claim 1 wherein said heating is effected at approximately 100° C. for approximately 2 hours.

7. A process according to claim 1 wherein said irradiating of said composition in said mold is effected for not more than five minutes.

8. A process according to claim 1 wherein said irradiating of said composition of said mold cures said outer portion of the liquid resin composition to a depth of approximately 1 o 2 mm.

* * * * *